U S010625357B2

United States Patent
Ozbaysal

(10) Patent No.: US 10,625,357 B2
(45) Date of Patent: Apr. 21, 2020

(54) BRAZE REPAIR OF TURBOMACHINE ENGINE COMPONENT

(71) Applicant: Siemens Energy, Inc., Orlando, FL (US)

(72) Inventor: Kazim Ozbaysal, Charlotte, NC (US)

(73) Assignee: SIEMENS ENERGY, INC., Orlando, FL (US)

( * ) Notice: Subject to any disclaimer, the term of this patent is extended or adjusted under 35 U.S.C. 154(b) by 0 days.

(21) Appl. No.: 16/475,238

(22) PCT Filed: May 26, 2017

(86) PCT No.: PCT/US2017/034698
§ 371 (c)(1),
(2) Date: Jul. 1, 2019

(87) PCT Pub. No.: WO2018/217213
PCT Pub. Date: Nov. 29, 2018

(65) Prior Publication Data
US 2019/0337073 A1    Nov. 7, 2019

(51) Int. Cl.
*B23K 1/00*    (2006.01)
*B23P 6/00*    (2006.01)
(Continued)

(52) U.S. Cl.
CPC ............ *B23K 1/0018* (2013.01); *B23K 1/20* (2013.01); *B23P 6/007* (2013.01); *C22F 1/10* (2013.01);
(Continued)

(58) Field of Classification Search
CPC .......... B23K 1/00; B23K 1/0018; B23K 1/20; B23K 2101/001; B23K 2103/08; B23P 6/00; B23P 6/002; B23P 6/02; B23P 6/04; B23P 6/005; C22F 1/10; F01D 5/005; F05D 2230/237; F05D 2230/40; F05D 2230/41; F05D 2230/80
See application file for complete search history.

(56) References Cited

U.S. PATENT DOCUMENTS

| 4,953,777 A | 9/1990 | Griffith et al. |
| 2003/0136811 A1 | 7/2003 | Philip |
| 2010/0024311 A1 | 9/2010 | Imano et al. |

OTHER PUBLICATIONS

PCT International Search Report and Written Opinion of International Searching Authority dated Mar. 2, 2018 corresponding to PCT International Application No. PCT/US2017/034698 filed May 26, 2017.

*Primary Examiner* — Colleen P Dunn
*Assistant Examiner* — Anthony M Liang

(57) ABSTRACT

System (10) and methods (1000) for structural braze repair of high gamma prime nickel base gas turbine components (1). The system may include a controller (200) operably connected to a heating system (100), e.g., a vacuum furnace, for controlling heat temperatures of the furnace for a specified or predetermined time period. A damaged component is placed in the furnace and heated to a first temperature, which is held for the specified time period before being cooled to about room temperature. The component is then heated to a second temperature higher than the first temperature, which is held for a second time period before being cooled again to about room temperature. After cooling the component may be braze repaired at a third temperature equal to or higher than the previous temperatures for a third time period.

25 Claims, 3 Drawing Sheets

(51) Int. Cl.
*B23P 6/04* (2006.01)
*B23K 1/20* (2006.01)
*C22F 1/10* (2006.01)
*F01D 5/00* (2006.01)
B23K 101/00 (2006.01)
B23K 103/08 (2006.01)

(52) U.S. Cl.
CPC ........ F01D 5/005 (2013.01); *B23K 2101/001* (2018.08); *B23K 2103/08* (2018.08); *F05D 2230/237* (2013.01); *F05D 2230/41* (2013.01); *F05D 2230/80* (2013.01)

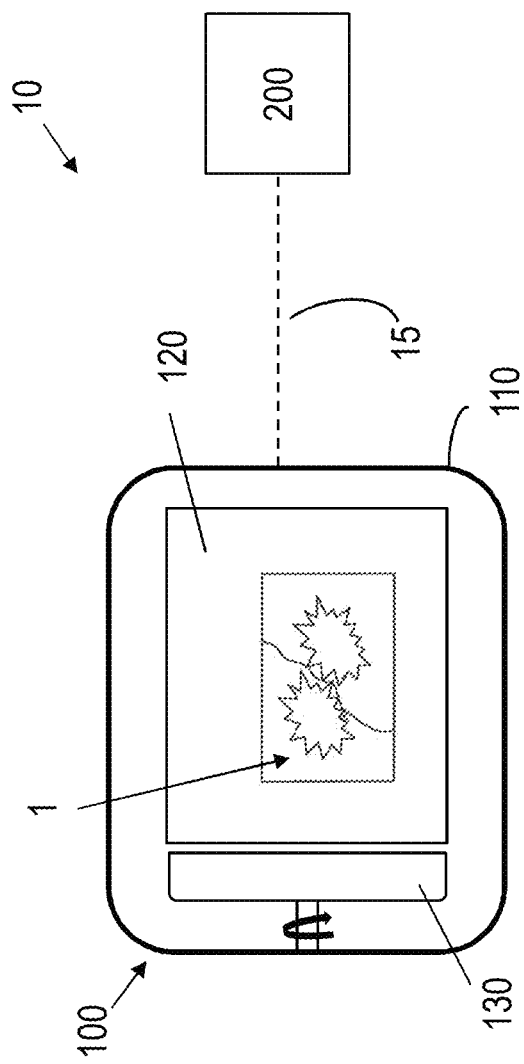
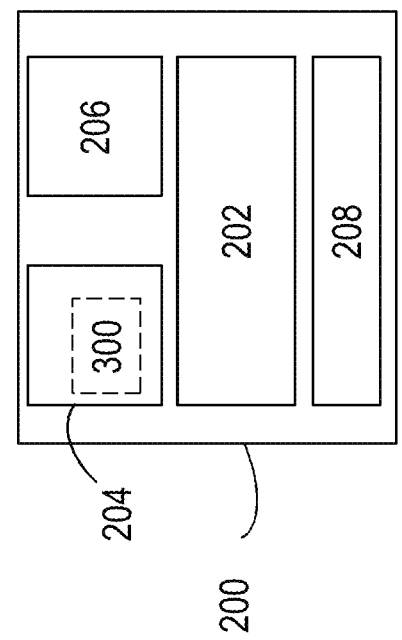
FIG. 2
FIG. 3

BRAZE REPAIR OF TURBOMACHINE ENGINE COMPONENT

TECHNICAL FIELD

The present disclosure relates generally to the field of materials technology, and more particularly to systems and methods of braze repair for industrial components, e.g., components of a turbomachine engine, e.g., a gas turbine engine.

BACKGROUND

In a turbomachine, such as a gas turbine engine, air is pressurized in a compressor section then mixed with fuel and burned in a combustion section to generate hot combustion gases. The hot combustion gases are expanded within a turbine section of the engine where energy is extracted to provide output power to produce electricity. The hot combustion gases travel through a series of stages when passing through the turbine section. A stage may include a row of stationary airfoils, i.e., vanes, followed by a row of rotating airfoils, i.e., blades, where the blades extract energy from the hot combustion gases for providing output power. Since the components within the combustion and turbine section are directly exposed to the hot combustion gases, these components may become damaged and need repairing.

Structural braze repair of these components is difficult due to high viscosity of the braze materials. Increasing the braze temperature to lower viscosity results in the grain boundary melting of the component. Grain boundary melting is not desirable and renders the component less useful.

SUMMARY

In one embodiment, a method for braze repairing one or more components of a turbomachine engine is provided. The method includes heating, e.g., at a slow heat rate, a damaged component to a first temperature and holding the first temperature for a first time period. The first time period may be a predetermined or specified amount of time. At the expiration of the first time period, the component is allowed to cool, e.g., to room temperature or approximately thereto, before the component is again heated to a second temperature, which is held for a second time period. The second temperature may be equal to or higher than the first temperature. The second time period may be equal to or different from the first time period. At the expiration of the second time period, the component is again cooled. Thereafter, the component may be inspected, e.g., via non-destructive testing, and depending upon the amount of grain boundary eutectic remaining, the component may undergo a third heat treatment similar to the any of the first or second heat treatments, or the brazing operation of the damaged component at, e.g., a fast heat rate may begin.

In another embodiment, a system for preparing a component for braze repair or braze repairing the component is provided. The system may include a controller operably connected to a heating system and optionally a cooling system. The heating system may be operably configured to produce heat temperature up to or beyond the melt temperature of the component or, e.g., a grain boundary eutectic melt temperature. The cooling system may be operably configured to cool or facilitated the cooling of the component to about room temperature, e.g., for inspection of the component to determine whether further heat treatments may be required. In operation, the damaged component may be carried by the heating system, and the controller may cause the heating system to produce heat to a first temperature, which once attained is held for a first time period. The component may then be cooled via the cooling system and/or naturally by reducing the heat produced by the heating system. Upon cooling of the component to, e.g., room temperature, or during the cooling phase, the component undergoes a second heat treatment where the component is heated to a second temperature, e.g., via a slow heat rate, and once the second temperature is attained, the second temperature is held for a second time period. The component is again cooled and may be inspected to determine whether to begin a braze repair operation or conduct subsequent heat treatments to further dissolve the grain boundary eutectic prior to the component being brazed.

BRIEF DESCRIPTION OF THE DRAWINGS

FIG. 2 illustrates a block diagram of an embodiment of a system for structural braze repair, and in accordance with the disclosure provided herein;

FIG. 3 illustrates an exemplary embodiment of a controller that may be utilized in the system of FIG. 2, and in accordance with the disclosure provided herein;

FIG. 7 illustrates a block diagram of a braze repair method for a component, and in accordance with the disclosure provided herein.

DETAILED DESCRIPTION

Figure 1:
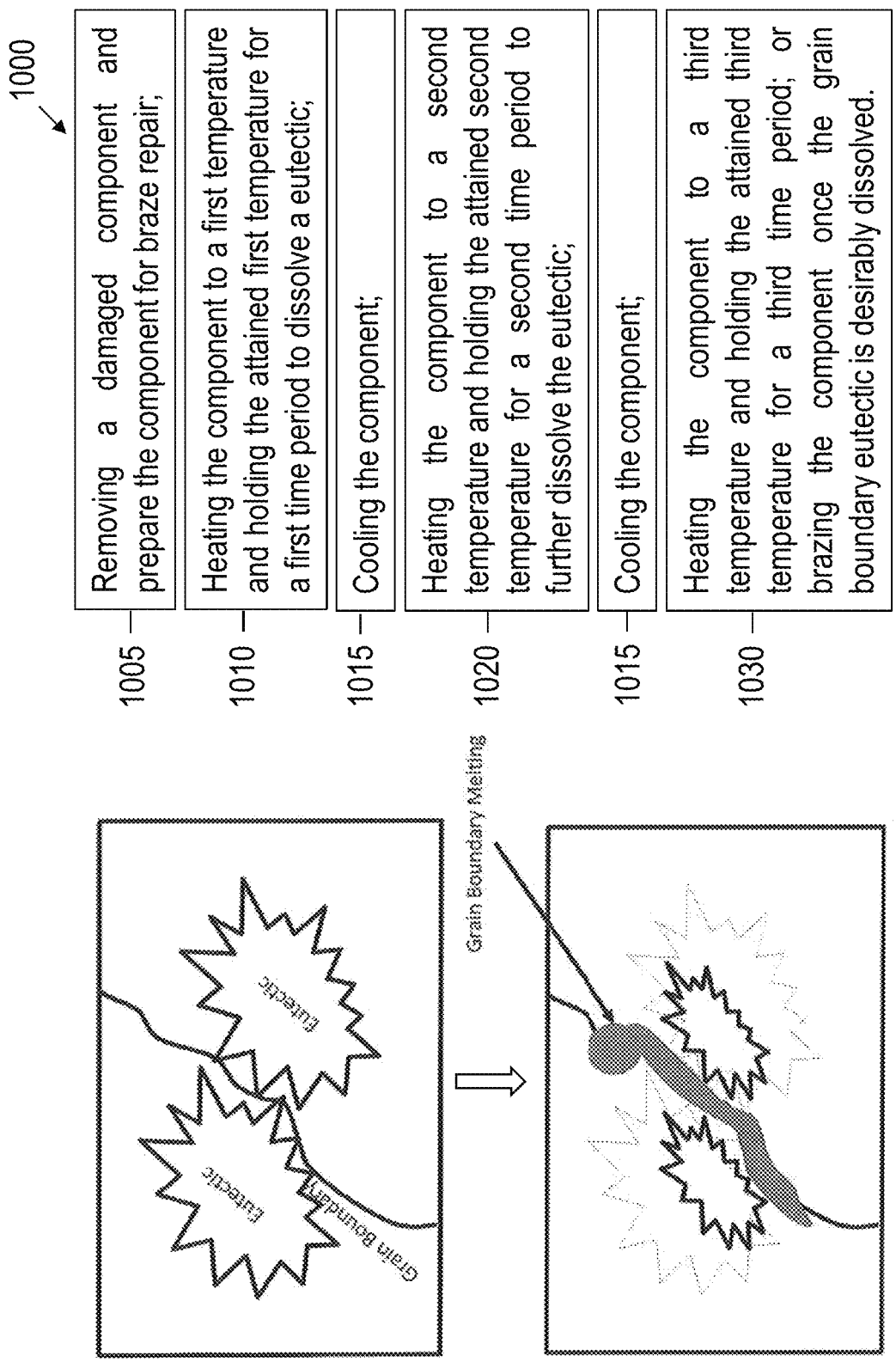
FIG. 1 illustrates a schematic illustration of a damaged component for use in a turbomachine engine prior to braze repair and after traditional methods of braze repair resulting in grain boundary melting.

Referring now to the drawings wherein the showings are for purposes of illustrating embodiments of the subject matter herein only and not for limiting the same, FIG. 1 is a schematic illustration of a turbomachine engine component, e.g., a gas turbine engine component, with common grain boundary low melting point eutectic in its metallurgical structure before and after traditional methods of braze repair, which results in melting of the grain boundary eutectic.

It should be appreciated that under traditional methods of braze repair, when the braze operation is carried out at temperatures higher than the grain boundary melting temperature of the component, grain boundary eutectic melting results which is undesirable.

As such, under traditional methods, the braze temperature and heating rate to braze temperature applied during the braze operation is limited due to the presence of grain boundary eutectic.

The present inventor has recognized the above limitations and has identified the weaknesses in the traditional methods. The present inventor now teaches a new technique for braze or weld repair, e.g., structural repair, of damaged components with grain boundary eutectic portions.

With reference now to FIG. 2, a block diagram of an exemplary embodiment of a braze repair system 10, e.g., for high gamma prime nickel base gas turbine components 1. As shown in FIG. 2, the system 10 may include a heating system 100 operable to produce heat up to or beyond a melt temperature of the eutectic grain boundary, e.g., temperatures between 0 and 3000° C. In one embodiment, the heating system 100 may be a furnace. The furnace 100 may be a vacuum furnace, e.g., with partial pressure, or an endothermic gas heat treatment furnace. Additionally or alternatively, the heat system 100 may be an induction heating system or other heating system chosen with should judgment and operable to produce heat up to or beyond melt temperatures of eutectic grain boundaries.

It should be appreciated that furnaces capable of producing lower or higher temperatures than the above mentioned melt temperatures may also be used when chosen with sound judgment and depending on the melt temperatures of the articles and/or materials therein.

The system 10 may further include one or more controllers 200 operably connected to the furnace 100, e.g., via a wired or wireless connection 15, and configured to control the heat temperatures of the furnace for a specified or predetermined time period. In the exemplary embodiment of FIG. 3, the controller 200 may include a processor 202 operably connected a memory 204 for executing one or more instructions or commands of a of a control application 300 carried by the memory 204, or other data storage system 206 operably connected to the processor 202, e.g., a hard disk drive, solid state drive etc. The controller may further include a user interface (not shown), which may be any general interface for receiving user input and generating a displayable output on a display (not shown). The controller 200 may also include a network adapter/transceiver 208 to facilitate communication between the controller 200 and other devices of the system 10, e.g., for receiving and transmitting operational or production information related to the furnace 100 and/or other cooling devices. It should be appreciated that the controller 200 may be carried by the furnace 100, i.e., connected thereto, or the controller 200 may be remote from the furnace 100. The series of instructions for the control application 300 may include instructions for causing the furnace to operate at a particular temperature for the specified period of time. Additionally or alternatively, the control application 300 may include instructions for operating one or more devices for cooling the component 1, e.g., to room temperature, and instructions for processing temperature or temperature related information, e.g., from one or more sensor assemblies operably carried by the furnace 100, for identifying the temperature(s) surrounding the component 1.

The system may also include a cooling system, apparatus or device 130 operably connected to furnace 100 and/or controller 200, e.g., for cooling the component 1. The cooling device 130 may be a separate unit from the furnace 100 or a system of the furnace operable to cool any components therein to a specified temperature or condition, e.g., room temperature.

With continued reference to the figures, and now to FIGS. 4-7, a method 1000 for braze repair of a component, e.g., a damaged component with grain boundary eutectic, is provided. After removal of the damaged component 1, e.g., from the turbomachine engine, the method 1000 may begin with steps for preparing the component 1 for repair, e.g., by mechanically or chemically removing any coatings, e.g., metallic and/or ceramic coatings, from the component 1(1005).

In this exemplary step, and because turbomachine engine components typically have one or more coatings protecting the component and/or underlying substrate during operation, removal of those coatings may be required for repairing the damaged component. Examples of types of mechanical removal processes may include removal via grit blasting, sanding, and/or shot peening. The chemical removal process may include, e.g., removal via chemical stripping and/or etching.

After removal of any coatings, the method for preparing the component 1 may further include a cleaning process, e.g., via a fluoride ion cleaning (FIC) or similar process, to remove, e.g., any oxides from cracks in the component 1. It should be appreciated that in the presence of tight cracks, e.g., extremely tight cracks, a carbide burr tool or Dremel cutting wheel may be used for opening the tight cracks prior to undergoing the cleaning process.

Upon completion of the cleaning process, or alternatively, if no cleaning was required, the method 1000 may include the step of placing the component into a heating system 100, e.g., a furnace, to undergo heat treatment. With the component being carried by the heating system 100, a first heat treatment of the component 1 may be applied/begin and includes heating the component 1 to a first temperature for a specified or predetermined period of time (1010). The first temperature may be a temperature below the grain boundary melt temperature to prevent grain boundary eutectic melting. For example, in an embodiment where grain boundary melting would otherwise occur at, e.g., 1265° C., the first temperature may be approximately 98 to 98.5% of the melt temperature 1265° C., e.g., 1245° C. The first temperature should be high enough to reduce or dissolve at least some of the eutectic without resulting in grain boundary eutectic melting. The first temperature may also be low enough to allow for subsequent heat treatments at temperatures higher than the first temperature and below temperatures that would otherwise cause undesirable grain boundary eutectic melting.

Additionally or alternatively, the first temperature may be a temperature above, e.g., a new make (as-cast) part solution treatment temperature of the component undergoing heat treatment. For example, in an embodiment where the component comprises CM 247, a solution treatment temperature (STT) may be 1232° C. for the new make as cast component. With an STT of 1232° C., the first temperature may be carried out at 1242° C., which represents about a 10° C. increase above the new make STT. It should be appreciated that the 10° C. increase may be dependent upon the type of superalloy material(s) present, and temperature increases between 10-30° C. above the STT are possible during heat treatment of the damaged component so long as undesirable grain boundary eutectic melting does not result. Again, the first (or subsequent heat treatment) temperatures should be high enough to dissolve at least some portions of the grain boundary eutectic without resulting in any grain boundary melting.

With continue reference to the figures and method 1000, heating of the component to the first temperature may be gradual, i.e., slow, as compared to the fast heating applied during traditional brazing operations. That is, the component may be heated to the first temperature slowly (slow heating) during the heat treatment, as slow heating assists to prevent melting of the grain boundary eutectic compound, while allowing time for dissolution of the eutectic. Examples of slow heating may include heating of the component to the first temperature at a rate of 2-5° C./min (slow heating rate).

Additionally or alternatively, and because slow heating from an initial temperature, e.g., room temperature, to the first temperature may require an excessive amounts of time, a combination of heating techniques (speeds), e.g., slow and accelerated (e.g., fast) heating, may be used to attain the first temperature, or any subsequent temperatures during the heat treatment. In this embodiment, i.e., where a slow heating may be combined with accelerated heating, the component may be initially heated via fast heating, e.g., up to 1100° C., and then slow heated, e.g., for an additional 145° C., to the first temperature. Because fast heating, e.g., up to the first temperature, may result in the grain boundary eutectic melting, slow heating must be employed after fast heating to attain the first temperature. Fast heating up to the first temperature during heat treatment should be avoided because quick increases in temperature beyond any thresholds as described herein may result in grain boundary eutectic melting. Therefore, fast heating during the heat treatment phase is preferably utilized before slow heating, and should be used to increase temperatures to about 100° C. below the first temperature. For example, in an embodiment where the first temperature is 1245° C., fast heating should continue to about 1145° C., which is 100° C. below the first temperature. It should also be appreciated that in further embodiments, fast heating may be utilized beyond the 100° C. threshold depending on the superalloy material and/or other considerations so long as no grain boundary eutectic results during the fast heating phase.

With continued reference to the figures, once the first temperature has been attained, the first temperature should be held, e.g., remain constant, for approximately one to two hours during the first heat treatment. It should be appreciated that while the first or any temperature is being held for a specified period of time, slight changes in the temperature may not negatively impact the grain boundary, provided that the differences in temperature are nominal and are consistent with the any criteria for determining the first temperature.

The specified or predetermined period of time for holding the first temperature during the first heat treatment may be, e.g., between thirty minutes and four hours depending on one or more of the eutectic compound size, substrate materials or other factors. That is, more or less time may be required. In an embodiment where the first temperature is about 1245° C., the time period may preferably be between forty-five minutes and three hours, or more preferably between one and two hours.

Slow heating to the first temperature and holding at that temperature for a predetermined period of time allows for the grain boundary eutectic to dissolve without melting. An example of this grain boundary eutectic reduction is illustrated in the embodiment of FIG. 4, which shows the damaged component 1 after the first heat treatment at, e.g., about 1245° C. for about two hours, which resulted in the grain boundary eutectic being partially dissolved and shrunken.

After heat treatment of the component 1, the component 1 is allowed to cool, e.g., to room temperature (1015). The component may be allowed to cool naturally, i.e., without assistance from any cooling system or other device, or cooling of the component may be via the cooling system 130 or any means known in the art for cooling components carried by a furnace. It should be appreciated that natural cooling to room temperature may be, e.g., by reducing the temperature of or within the heating system 100 to room temperature, or by reducing the component 1 temperature to room temperature. For determining current temperatures of the component or within the furnace, one or more sensor assemblies, laser reading systems or temperature gauges may be operatively connected to or employed within the furnace to determine the current temperatures.

With continued reference to the figures, upon cooling to room temperature, the method 1000 may further include a second heat treatment by heating the component 1 to a second temperature for a second time period (1020). It should be appreciated that the heating of the component to the second temperature may begin once the component 1 has been cooled to room temperature after the first heat treatment, or at any time during the cool down process when chosen with sound judgment. It should further be appreciated that heating to the second temperature may also be by slow heating, or by any combination of heating techniques as described for the first heat treatment, e.g., fast to slow heating as the temperature approaches the second temperature for further dissolution of the grain boundary eutectic.

Figure 4:
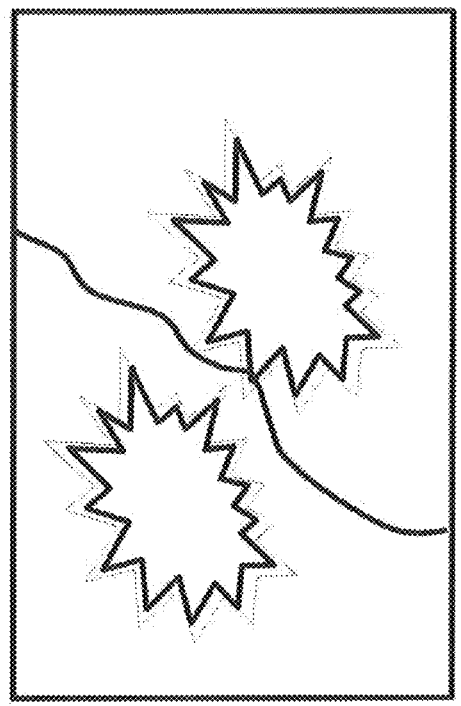
FIG. 4 illustrates a schematic illustration of the damaged component of FIG. 1 after a step of a servicing operation has been implemented, the grain boundary eutectic being partially dissolved and shrunken, and in accordance with the disclosure provided herein.
Figure 5:
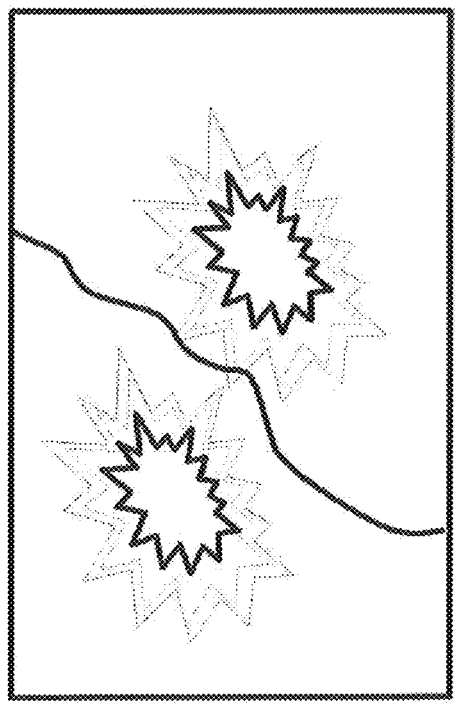
FIG. 5 illustrates a schematic illustration of the damaged component of FIG. 1 undergoing another step in the servicing operation, the grain boundary eutectic further dissolved and shrunken, and in accordance with the disclosure provided herein.

As illustrated FIG. 5, the grain boundary eutectic of FIG. 4 is further dissolved and shrunk following the second heat treatment. The means for determining the second temperature may be similar to the above means for determining the first temperature. For example, where grain boundary eutectic melting would otherwise occur at, e.g., 1265° C., the second temperature may be approximately 99 to 99.5% of the melt temperature 1265° C., e.g., 1255° C. It should be appreciated that the second temperature should be high enough to reduce or further dissolve the grain boundary eutectic size without resulting in any melting. Additionally or alternatively, the second temperature may be greater than the first temperature, e.g., about 0.8 to 0.85% greater, which still remains below temperatures that would otherwise result in undesirable grain boundary melting. It should also be appreciated that the heating rate, e.g., the slow heating rate, may be similar to the heating rate of the first heat treatment, e.g., an increase in temperature of about 2-5° C./min.

Similar to the first time period, the second time period for the second temperature may be, e.g., between thirty minutes and four hours and dependent on the remaining eutectic compound. After the second heat treatment, i.e., holding the second temperature for the second time period, e.g., between one and two hours, the component 1 is allowed to cool, e.g., to room temperature via the cooling system 130 or other cooling means known in the art (1015).

Upon cooling the component 1 to room temperature after the second heat treatment, the component 1 may be ready for the braze repair operation, i.e., braze repair. The braze repair may be carried out at any of the previous temperature, e.g., the first or second temperature, that dissolved the grain boundary eutectic, e.g., 1255° C., or at a third temperature, which may be the grain boundary melt temperature, e.g., 1265° C., or higher than the previous temperatures of the first and second heat treatments for a third time period (1030). In this embodiment, the heating rate during the braze repair differs from the heat rate during the heat treatment in that the braze repair heat rate is as fast as possible to prevent erosion, i.e., to prevent the braze material to dissolve the base metal component. An example of this fast heat rate may be an increase of about 10-30° C./min.

Once the desired hold temperature, i.e., the desired/attained temperature for the braze repair is attained, e.g., the third temperature, the time period for the braze repair may be shorter than both the first and second time period or may extend beyond any of the previous time periods depending on the extent of the braze repair required to bring the component 1 to an operational condition, i.e., a condition where the component has the structural integrity to return to the turbomachine engine. For example, the third time period may be between 0.1 and 12 hours, or preferably between thirty minutes and 12 hours. Because the third temperature may be the grain boundary eutectic melt temperature, e.g., 1265° C., less time may be required to complete the braze repair. It should be appreciated that fast heating to the braze temperature ensures minimum chemical interaction between the component 1 and braze material, and therefore lowers the amount of erosion. It should further be appreciated that the fast heating rate of the braze operation does not result in the grain boundary melting of the base metal because the base metal grain boundary eutectic has dissolved for this temperature.

Additionally or alternatively, prior to the braze repair operation 1030, the method 1000 may further include a third heat treatment, via repeating either step 1010 or 1020 for a specified period of time to further dissolve the grain boundary eutectic prior to braze repair. It should be appreciated that the third heat treatment may be carried out at a temperature higher than any of first and second temperatures and provided that the temperature does not result in grain boundary melting upon application. It should also be appreciated that similarly to the first and second heat treatment, attaining the third temperature may be via slow heating to the third temperature or via a combination of fast than slow heating as described in any of the first and second heat treatments, e.g., fast heating to a desired temperature below the third temperature and then slow heating at, e.g., about 2-5° C./min, then holding the third temperature for about one to two hours before cooling to room temperature. Depending on the grain boundary eutectic after the third heat treatment, subsequent heat treatments similar to any of the previous heat treatments may be required prior to the braze operation, which may be carried out at any of the temperatures of previous heat treatments or at a higher braze temperature.

Figure 6:
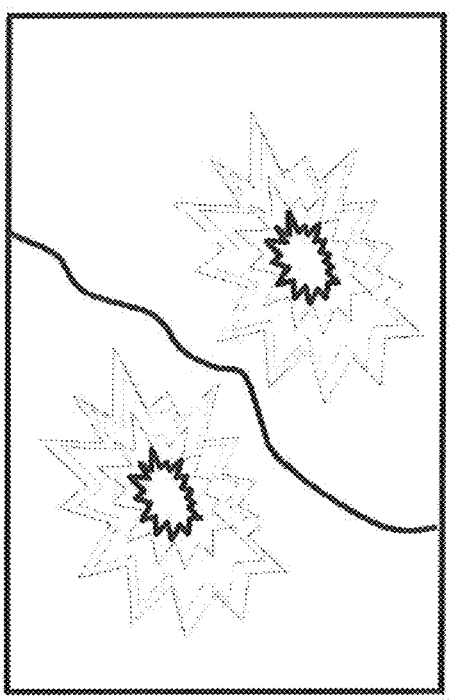
FIG. 6 illustrates a schematic illustration of the damaged component of FIG. 1 undergoing yet another step in the servicing operation, the grain boundary eutectic even further dissolved and considerably smaller after undergoing the servicing operation, and in accordance with the disclosure provided herein.

As can be seen in FIG. 6, after a third heat treatment, similar to the first and second heat treatments, the grain boundary eutectic portion has further dissolve and is considerably smaller.

With continue reference to the figures, additionally or alternatively, the method 1000 may further include testing the component 1, e.g., via non-destructive testing or any other testing means known in the art to determine whether the integrity of the component 1 has been compromised during heat treatment and prior to returning the component 1 to operation. The testing may be carried out during the cooling of the component 1 or at any time prior to heating the component 1 to the second, third or subsequent temperatures to dissolve grain boundary eutectic. Additionally or alternatively, and prior to returning the repaired component 1 to operation, the method 1000 may further include applying one or more coatings to the component 1. The coatings may be applied via known means in the art for applying coatings to the component 1, e.g., via spraying, vapor deposition etc.

While specific embodiments have been described in detail, those with ordinary skill in the art will appreciate that various modifications and alternative to those details could be developed in light of the overall teachings of the disclosure. For example, elements described in association with different embodiments may be combined. Accordingly, the particular arrangements disclosed are meant to be illustrative only and should not be construed as limiting the scope of the claims or disclosure, which are to be given the full breadth of the appended claims, and any and all equivalents thereof. It should be noted that the term "comprising" does not exclude other elements or steps and the use of articles "a" or "an" does not exclude a plurality.

I claim:

1. A method comprising:
   heating a damaged component to a first temperature and holding at the first temperature for a first time period to dissolve a grain boundary eutectic;
   cooling the component;
   heating the damaged component to a second temperature greater than the first temperature and holding the second temperature for a second time period to further dissolve the grain boundary eutectic; and
   cooling the component.

2. The method of claim 1, wherein heating of the damaged component is via a first heating rate to at least one of the first temperature and second temperature.

3. The method of claim 2, wherein the first heating rate is via a heating rate of 2-5° C./min.

4. The method of claim 1, wherein heating of the damaged component is via a first heating rate to a first threshold temperature lower than the first temperature followed by heating at a second heating rate that is slower than the first heating rate to at least one of the first temperature and second temperature.

5. The method of claim 1 further comprising:
   braze repairing the damaged component at a braze temperature after the component has completed the second cooling step.

6. The method of claim 5 further comprising:
   prior to braze repairing the damaged component, heating the component to a third temperature and holding the third temperature for a third time period to dissolve the grain boundary eutectic.

7. The method of claim 6 further comprising:
   cooling the component after the third time period and prior to braze repairing.

8. The method of claim 5, wherein braze repair of the component is between 0.1 to 12 hours.

9. The method of claim 6, wherein the third temperature is equal to or greater than one of the first and second temperatures.

10. The method of claim 5, wherein the braze temperature is attained via a first heating rate.

11. The method of claim 10, wherein the first heating rate is 10-30° C./min.

12. The method of claim 5, wherein the braze temperature is the grain boundary eutectic melt temperature.

13. The method of claim 5, wherein the braze temperature is equal to or greater than any of the first and second temperatures, and wherein the braze temperature is attained via a first heating rate.

14. The method of claim 13, wherein the first heating rate is 10-30° C./min.

15. The method of claim 1 further comprising:
   preparing the damaged component for repair prior to heating the component to the first temperature.

16. The method of claim 15 wherein preparing the damaged component comprises removing any coatings from the damaged component.

17. The method of claim 16, wherein the coatings are removed via a chemical or mechanical process.

18. The method of claim 15, wherein preparing the damaged component comprises cleaning oxides from cracks of the damaged component.

19. The method of claim 18, wherein the oxides are cleaned via a fluoride ion cleaning process.

20. The method of claim 1, wherein the first temperature is above a newmake component solution treatment temperature (STT) of the damaged component.

21. The method of claim 20, wherein the first temperature is 10° C. above the STT.

22. The method of claim 1, wherein at least one of the first and second time periods is between 1 and 2 hours.

23. The method of claim 1, wherein heating to the second temperature commences prior to the component cooling to room temperature.

24. The method of claim 1 further comprising:
   testing the component via a non-destructive testing prior to returning the component to service.

25. The method of claim 1 further comprising:
   applying at least one coating to a surface of the component prior to returning the component to service.

* * * * *